(12) United States Patent
Mathews

(10) Patent No.: US 8,820,373 B2
(45) Date of Patent: Sep. 2, 2014

(54) TIRE HAVING RIBS, CIRCUMFERENTIAL GROOVES AND SIPE PAIRS

(75) Inventor: Daniel S. Mathews, Mount Vernon, IL (US)

(73) Assignee: Continental Reifen Deutschland GmbH, Hannover (DE)

( * ) Notice: Subject to any disclaimer, the term of this patent is extended or adjusted under 35 U.S.C. 154(b) by 1737 days.

(21) Appl. No.: 11/320,849

(22) Filed: Dec. 30, 2005

(65) Prior Publication Data

US 2007/0151645 A1 Jul. 5, 2007

(51) Int. Cl.
*B60C 11/04* (2006.01)
*B60C 11/12* (2006.01)
*B60C 11/13* (2006.01)
*B60C 11/03* (2006.01)

(52) U.S. Cl.
CPC ......... *B60C 11/0309* (2013.04); *B60C 11/1315* (2013.04); *B60C 11/042* (2013.04); *B60C 11/045* (2013.01); *B60C 11/047* (2013.04); *Y10S 152/90* (2013.01); *Y10S 152/03* (2013.01)
USPC ............ 152/209.18; 152/209.21; 152/209.24; 152/900; 152/DIG. 3

(58) Field of Classification Search
USPC .................. 152/209.18, 209.21, 209.24, 900, 152/DIG. 3
See application file for complete search history.

(56) References Cited

U.S. PATENT DOCUMENTS

| | | | |
|---|---|---|---|
| D112,978 S | 1/1939 | James | |
| 2,239,070 A | 4/1941 | Overman et al. | |
| 2,779,378 A * | 1/1957 | Robertson | 152/900 |
| 2,843,172 A | 7/1958 | Berry et al. | |
| 2,938,560 A | 5/1960 | Wallace et al. | |
| D191,778 S | 11/1961 | Hawkinson | |
| 3,055,410 A | 9/1962 | Caulkins | |
| 3,550,665 A * | 12/1970 | Verdier | 152/209.18 |
| 3,682,220 A * | 8/1972 | Verdier | 152/900 |
| D239,767 S | 5/1976 | Yahagi et al. | |
| RE30,527 E * | 2/1981 | Verdier | 152/900 |
| 4,271,886 A * | 6/1981 | Bachmann et al. | 152/209.18 |
| 4,387,755 A * | 6/1983 | Kato et al. | 152/901 |
| D317,427 S | 6/1991 | Enoki et al. | |
| 5,099,899 A | 3/1992 | Takeuchi | |
| 5,154,216 A | 10/1992 | Ochiai et al. | |
| 5,246,049 A | 9/1993 | Ramcke et al. | |
| 5,535,798 A | 7/1996 | Nakamura | |

(Continued)

FOREIGN PATENT DOCUMENTS

| | | | |
|---|---|---|---|
| EP | 256247 | * | 2/1988 |
| EP | 602989 | * | 6/1994 |
| EP | 849101 | * | 6/1998 |
| EP | 855292 | * | 7/1998 |
| EP | 0680837 | | 12/1998 |

(Continued)

OTHER PUBLICATIONS

U.S. Appl. No. 11/276,785, filed Mar. 14, 2005.

(Continued)

*Primary Examiner* — Steven D Maki
(74) *Attorney, Agent, or Firm* — Andrew M. Calderon; Roberts Mlotkowski Safran & Cole, P.C.

(57) ABSTRACT

Tire having a tread pattern with superior performance characteristics. The tread pattern includes ribs and circumferential grooves which are at least one of tapered and/or generally V-shaped. The walls of each circumferential groove have a wavy and/or sinusoidal contour extending in a generally circumferential direction.

20 Claims, 10 Drawing Sheets

(56) References Cited

U.S. PATENT DOCUMENTS

| | | |
|---|---|---|
| D382,235 S | 8/1997 | Nelson |
| D390,170 S | 2/1998 | Stone et al. |
| D399,460 S | 10/1998 | Albert |
| 5,924,464 A | 7/1999 | White |
| 6,050,313 A * | 4/2000 | Tsuda .................. 152/209.18 |
| D451,860 S | 12/2001 | Schuster et al. |
| D457,127 S | 5/2002 | Warchol |
| 6,412,531 B1 | 7/2002 | Janajreh |
| 6,415,835 B1 | 7/2002 | Heinen |
| 6,488,064 B1 * | 12/2002 | Radulescu .................. 152/901 |
| 6,609,548 B2 | 8/2003 | Kousaie et al. |
| D500,287 S | 12/2004 | Gojo |
| 2002/0092591 A1 * | 7/2002 | Cortes .................. 152/209.18 |
| 2003/0047262 A1 | 3/2003 | Kousaie et al. |

FOREIGN PATENT DOCUMENTS

| | | | |
|---|---|---|---|
| GB | 525466 | | 8/1940 |
| GB | 903389 | * | 8/1962 |
| GB | 1189445 | | 4/1970 |
| JP | 56-079007 | * | 6/1981 |
| JP | 58-177703 | * | 10/1983 |
| JP | 60-197409 | * | 10/1985 |
| JP | 04-047907 A | * | 2/1992 |
| JP | 09-011708 | * | 1/1997 |
| JP | 2005-112085 | * | 4/2005 |

OTHER PUBLICATIONS

U.S. Appl. No. 11/311,330, filed Dec. 20, 2005.

* cited by examiner

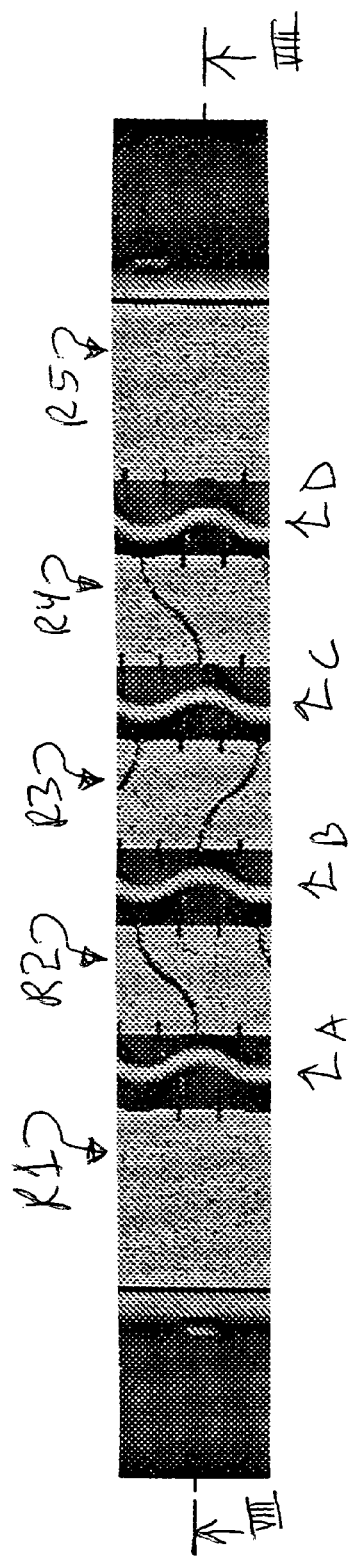

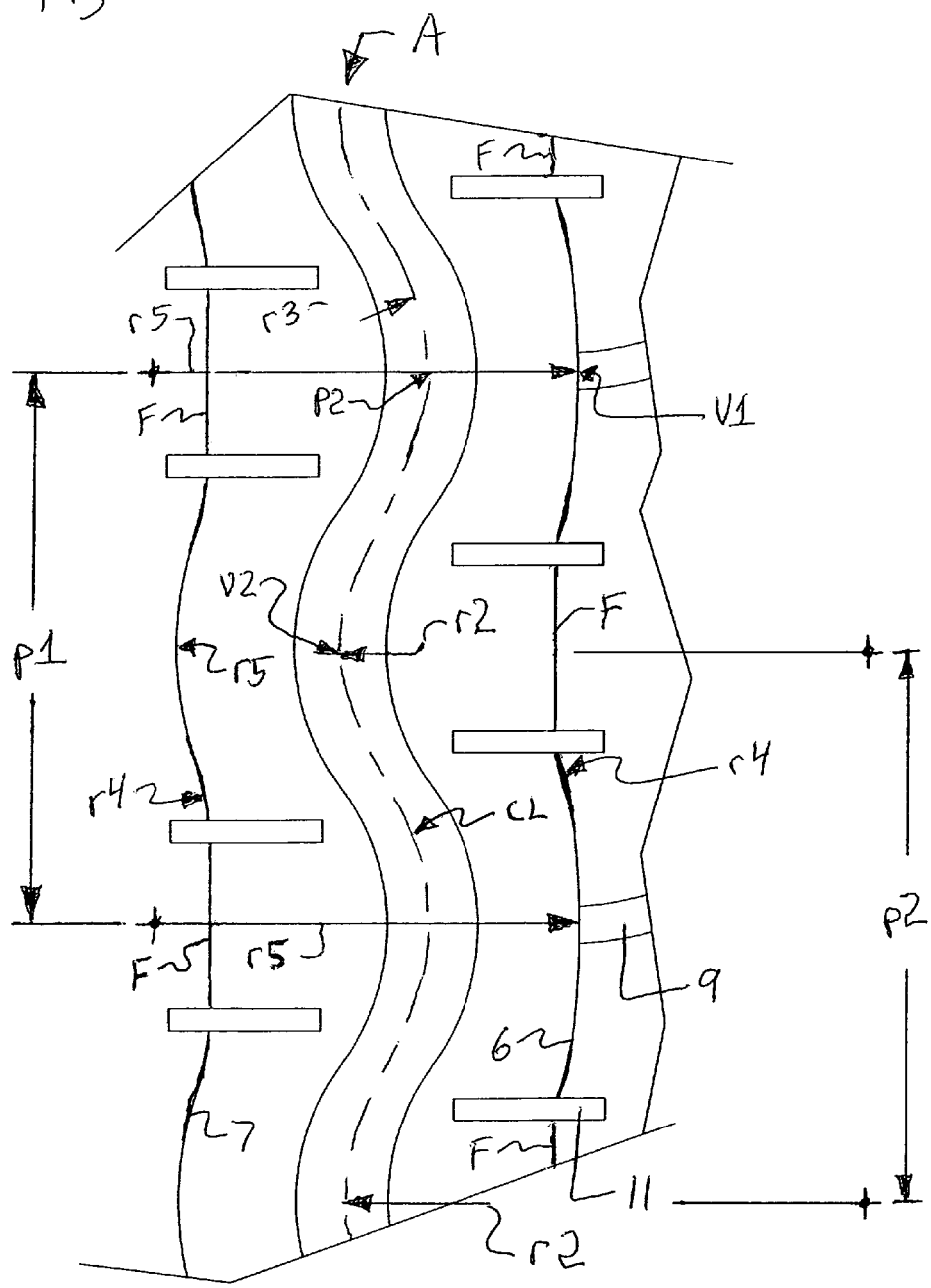

TIRE HAVING RIBS, CIRCUMFERENTIAL GROOVES AND SIPE PAIRS

FIELD OF THE INVENTION

The invention generally relates to a pneumatic tire having a tread pattern and, more particularly, to a pneumatic tire for a vehicle having a tread pattern that provides superior performance characteristics.

BACKGROUND OF INVENTION

Tire design and more specifically tread pattern design plays a critical role in the safe and efficient operation of a vehicle. For example, it is known that the tread pattern assists in the generation of steering forces, as well as driving and braking forces. Also, the tread pattern can improve vehicle performance by reducing road noise, providing superior grip capabilities in both wet and/or dry driving conditions, as well as minimizing rolling resistance to increase the overall fuel economy of the vehicle.

In examining the complex mechanisms involved in proper tread pattern design, several factors play a role in the final design of the tread pattern. These factors include industry standards, government regulations, customer specifications, marketing requirements and the like. On the other hand, the complex mechanisms which are taken into account in the design of the tread pattern include, amongst other mechanisms, stresses generated upon the tire during driving conditions, energy losses due to rolling resistance, sidewall flexing, to a host of other mechanisms. Thus, the design of a tread pattern is not a trivial task and, in fact, is quite complex requiring the need to take into account many different considerations.

In practice, the design of a tire tread pattern also requires the balancing of many contradictory demands. Finding the proper structure that balances these demands for any given tire is thus a great challenge. For this and other reasons, engineers typically focus on a large array of considerations, placing emphasis on certain design criteria over others, depending on the specific application of the tire. However, by focusing on certain design criteria, other criteria such as tire wear or stress components may not have been weighed as heavily during the design stage.

By way of a more specific illustration, one design approach has been to form grooves between ribs with negatively sloped walls to increase gripping capabilities. However, in such an approach, the grooves are more likely to trap and retain stones, which can damage the tire. Another example is in the use of all-season tires, which customarily employ block elements in their tread design. These designs have superior grip performance but tend to have increased noise level, as well as have a tendency toward irregular wear due primarily to their lack of stiffness in the circumferential direction of the tread. Such noise generation and irregular wear are accentuated at acute or sharp angles in the rubber blocks formed by intersections of groove walls.

In any event, tire patterns have common pattern traits. These common pattern traits include, for example, grooves with sharp or acute angles in transitional areas, e.g., between treads, vertical walls forming the grooves or treads, etc. It has been theorized that such designs have large stress components which conjugate at the sharp angles, as well as result in increased road noise and rolling resistance. Of course, engineers are constantly designing tread patterns to increase overall tire efficiency, but these design traits remain pervasive.

SUMMARY OF THE INVENTION

In a first aspect of the invention, a tire comprises a tread pattern with straight circumferential grooves each having groove walls or rib walls which are tapered and/or generally V-shaped. The tapered walls also have a wavy and/or sinusoidal contour or configuration extending in the circumferential direction.

In another aspect of the invention, the tire further comprises a plurality of wavy rib grooves which extend completely across or beyond at least one of the ribs and which open out to two adjacent circumferential grooves. The wavy grooves define a plurality of tread blocks and can be equally circumferentially spaced. The tread blocks may have the same circumferential length. The wavy rib grooves can be substantially shallower than the circumferential grooves. The tread blocks form the contact surface of the tire and can also include oppositely arranged pairs of sipes. The pairs of sipes can be oriented generally axially and can be formed at edge regions of the blocks. The pairs of sipes can extend partially into the rib or blocks and partially into one of the circumferential groove walls. Each of the blocks can have oppositely arranged edges which are curved outwardly. Each of the blocks can have oppositely arranged edges which are curved outwardly in a center portion of the blocks. Each of the blocks can have oppositely arranged edges which are curved outwardly in the center and inwardly at portions of the block edges which are arranged adjacent to the wavy rib grooves. The pairs of sipes can extend through outwardly curved portions of the block edges. Each of the circumferential grooves can have curved or partially circular base. The base of the circumferential grooves can have a wavy or sinusoidal waveform which is oriented circumferentially or in the circumferential direction.

In another aspect of the invention, all of the circumferential grooves have substantially the same depth relative to the contact surface and all of the wavy rib grooves have the same depth relative to the contact surface. The wavy rib grooves can have a width which is a fraction of the width of the circumferential grooves as measured at the block edges. The wavy rib grooves can have a width which is a fraction of the width of base width of the circumferential grooves. Each sipe can have a width which is a fraction of the width of base width of the circumferential grooves. Each sipe can have a width which is equal to or less than a width of the wavy rib groove. The curvature of the outwardly curved block edges (measured orthogonal from a radial axis) can be greater than the curvature of the base of the circumferential grooves (measured orthogonal from a radial axis). The pitch length of the outwardly curved block edges can be greater than the pitch length of the wavy base portion of the circumferential grooves. The pitch length of the outwardly curved block edges can be twice as great as the pitch length of the wavy base portion of the circumferential grooves. The circumferential groove walls can have variable angles and can be devoid of sharp edges. The base or bottom portion of each circumferential groove is rounded and/or inwardly curved and has a wavy and/or sinusoidal waveform in the circumferential direction.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 7 is a partial enlarged view of the tire shown in FIG. 1, in accordance with an embodiment of the invention;

FIG. 10 is another enlarged partial view of the tread pattern of the tire of FIG. 1.

DETAILED DESCRIPTION OF EMBODIMENTS OF THE INVENTION

Figure 1:
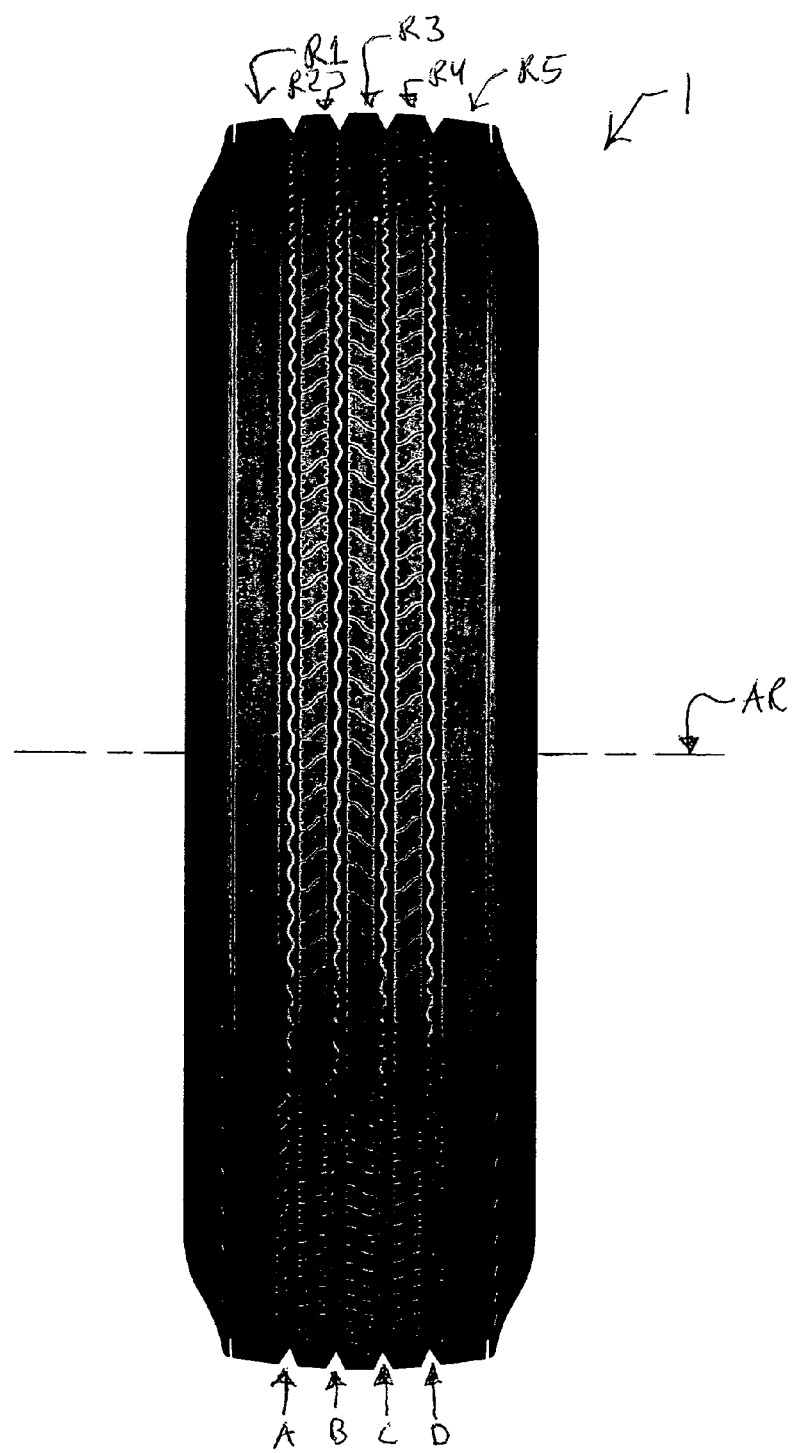
FIG. 1 is a front view of a tire in accordance with an embodiment of the invention.

The present invention is directed to a tire with a tread pattern having superior performance characteristics. In embodiments of the invention, the tread pattern includes a plurality of circumferential grooves having tapered, angled, and/or V-shaped grooves whose groove walls have a wavy pattern and/or a variable groove wall contour. The circumferential grooves are straight grooves, i.e., grooves for which the groove edges at the outer surface of the tread are disposed such that a plane which is perpendicular to the axis of rotation of the tire could be located between the groove edges without intersecting any edge of the groove. That is to say, the groove edges need not be parallel to one another, neither need the centerline of the groove be straight in order for a circumferentially extending groove to be a straight groove. The base or bottom of the circumferential grooves has a waveform or sinusoidal pattern which curves back and forth laterally around the circumference of the tire. In the design of the invention, the sidewalls are tapered with respect to a radial or equatorial plane. In use, the tread pattern of the present invention exhibits superior stone trapping resistance, groove cracking resistance, pressure distribution, as well as increased wet traction and tread mileage properties. It has also been found that the tread pattern of the present invention contributes to a decrease in road noise.

FIGS. 1-10 show a non-limiting embodiment of the tire of the invention. The tire 1 can have a non-directional tread or a directional tread. In the embodiment of FIGS. 1-10, the tread pattern includes a plurality of independent circumferential rows or ribs R1, R2, R3, R4, R5. Although five ribs are shown R1-R5, it should be understood that two or more ribs are further contemplated by the invention, depending on the specific application. Ribs R1 and R5 are arranged adjacent the side walls and are lateral ribs; whereas ribs R2-R4 are center ribs. Ribs R1 and R5 also have a greater width (measured axially) than the center ribs R2-R4. The ribs R1-R5 each include a contacting surface S which is curved outwardly in the same way as conventional tire treads.

The tire 1 can, in particular, be a radial ply pneumatic medium truck tire according to the preferred embodiment of the invention. In addition to the tread, the tire 1 has an axis of rotation AR (i.e., an axis about which the tire rotates), a pair of lateral edges, a tread width TW (see FIG. 8) defined as the axial distance between lateral edges, and an equatorial plane EP (see FIG. 8). The equatorial plane EP is a plane perpendicular to the axis of rotation and spaced equidistant from the lateral edges. The ribs R1-R5 of the tread extend radially outwardly from the tread base 3 (see FIGS. 4A, 4B, 6A, and 6B). A plurality of circumferentially continuous wide grooves A-D separate the ribs R1-R5. A plurality of narrow laterally extending wavy grooves 9 (see FIG. 2) separate circumferentially adjacent traction elements or blocks 10 (see FIG. 9). A plurality of laterally extending sipes 11 are also utilized (see FIG. 2). The wavy grooves 9 are narrow grooves separating the traction elements 10 (see FIG. 9) of the three central rows and are of a wavy pattern with a sinusoidal wave form. The wavy grooves 9 are defined by a radius r6 which is measured from a center of the flats F (see FIG. 9). By way of non-limiting example, the radius r6 from the center of the flat F of edge 7 to the peak P3 (measured at center line cl) can be approximately 13.778 mm. Similarly, the radius r7 from the center of the flat F of the edge 6 to the valley V3 (measured to the center line cl) can be approximately 13.778 mm.

The grooves A-D are each defined by tapered rib walls 4 and 5 (lateral sides of the grooves). Each groove A-D extends substantially straight from a groove base 8 (see FIG. 2) to the rib contact surface S (See FIG. 2) and groove opening which is defined by edges 6 and 7. As a result, the base 3 of each rib R1-R5 is wider than the contact surfaces S of each rib R1-R5. A function of the tapered rib walls 4 and 5 of the circumferential ribs A-D is to help buttress the tread elements against cornering forces generated by and placed upon the tread ribs. The tapered rib walls 4 and 5 of the tread design of this invention also vary circumferentially and/or have a variable angle contour. In this manner, the lateral sides of the grooves A-D (which are synonymous with the rib walls) define the taper from each lateral side of the groove base 8 to the groove opening according to the taper angle of the groove; as can best be seen in FIGS. 3, 4A, 4B, 5, 6A and 6B. The grooves A-D, in the preferred embodiment, each have a depth defined by an average and/or constant distance from the external surface S of the tread to the bottom surface of the groove base 8 or rib base 3. A median plane (which is parallel to the equatorial plane) bisects the channel formed by the respective surfaces 4 and 5 of each groove A-D (see FIGS. 4A, 4B, 6A and 6B). An imaginary line or arc is located on the median plane within the depth of the groove A-D. If the groove A-D runs circumferentially, then the imaginary arc will follow the curvature of the tire 1. Each groove base 8 meanders axially back and forth in a manner which crosses an imaginary center line (centrally disposed between flats F of the opposite edges 6 and 7) extending through each groove A-D.

Figure 2:
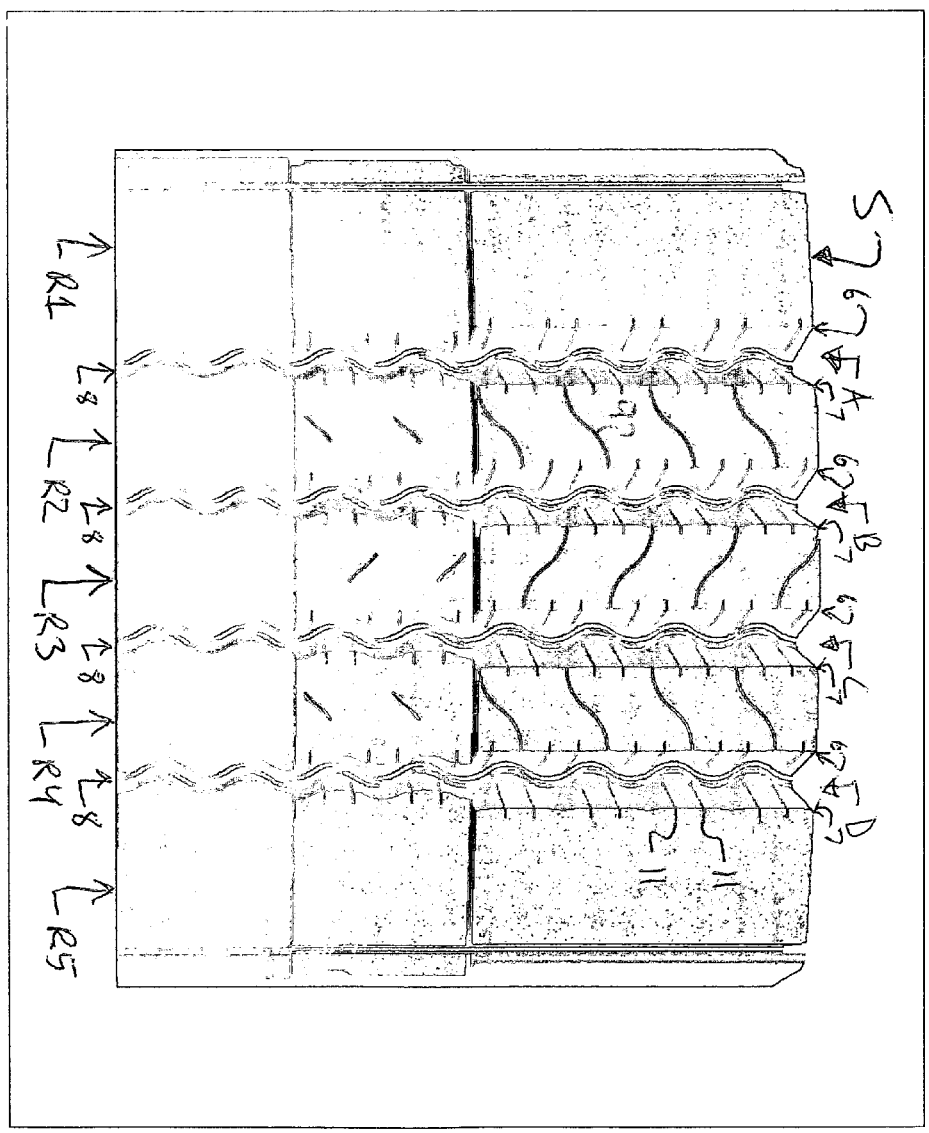
FIG. 2 is an enlarged partial view of the tire of FIG. 1 with the middle section and bottom sections having outer sections of the tread removed to show successively deeper portions of the tire tread, in accordance with an embodiment of the invention.

FIG. 2 is an enlarged view of the tread pattern shown in FIG. 1. As shown in FIG. 2, each groove A-D has a base 8 which has a sinusoidal waveform that meanders laterally and/or axially along the circumferential direction so as to define peaks (high points facing right) and valleys (low points facing left). The distance (measured circumferentially) between adjacent peaks P2 (see FIG. 9) is the same as the distance between adjacent valleys V2, which defines a pitch length p2 (see FIG. 9). The pitch length p2 is also defined as the circumferential length between the center points of adjacent flats F of edge 6 (see FIG. 10). The base portion 8 of the grooves A-D constitute the deepest portions of the tread and define the tread base 3. Each lateral rib R1 and R5 has equally circumferentially spaced pairs of sipes 11. The sipes 11 of the lateral ribs R1 and R5 are centrally disposed relative to the valleys V2 of groove bases 8 of the grooves A and D and repeat with the same regularity or phase as the valleys V2 of the groove base 8. The sipes 11 of the lateral ribs R1 and R5 can each have a width that is, by way of non-limiting example, approximately 1 mm and a depth that is approximately 3 mm at a shallower portion of the sipe 11 (see FIG. 2) to approximately 75% of the tread depth at a deeper portion located between the center of the sipe 11 and the end that extends into the groove and past the groove opening edge 6, 7 (see FIG. 2).

Each center rib R2-R4 has oppositely arranged pairs of sipes 11. The sipes 11 of the center ribs R2-R4 are centrally disposed relative to the peaks P2 of groove bases 8 of the grooves A and D and repeat with the same regularity or phase as the peaks P2 of the groove base 8. The sipes 11 of the center ribs R2-R4 can have a width that is approximately 1 mm and a depth that is approximately 3 mm at a shallower portion of the sipe 11 (see FIG. 2) to approximately 75% of the tread depth at a deeper portion located between the center of the sipe 11 and the end of the sipe 11 that extends into the groove and past the groove opening edge 6, 7 (see FIG. 2). The wavy grooves 9 of the center ribs R2-R4 have opposite ends which are centrally disposed relative to the valleys V1 of the inwardly curved portions of the groove opening edges 6 and 7 (and repeat with the same regularity or phase as the valleys V1 of the groove opening edges 6 and 7. The wavy grooves 9 each have deeper center portions and shallower end portions as evidenced in FIG. 2.

The pairs of sipes 11 of each left side edge 6 of grooves A-D are all aligned and in phase circumferentially as are the pairs of sipes 11 of each right side edge 7 of grooves A-D. However, the sipes 11 of the left side edges are a half pitch out of phase relative to the sipes 11 of the center ribs R2-R4. Of course, the sipes 11 can also be arranged with other configurations and spacing.

Figure 9:
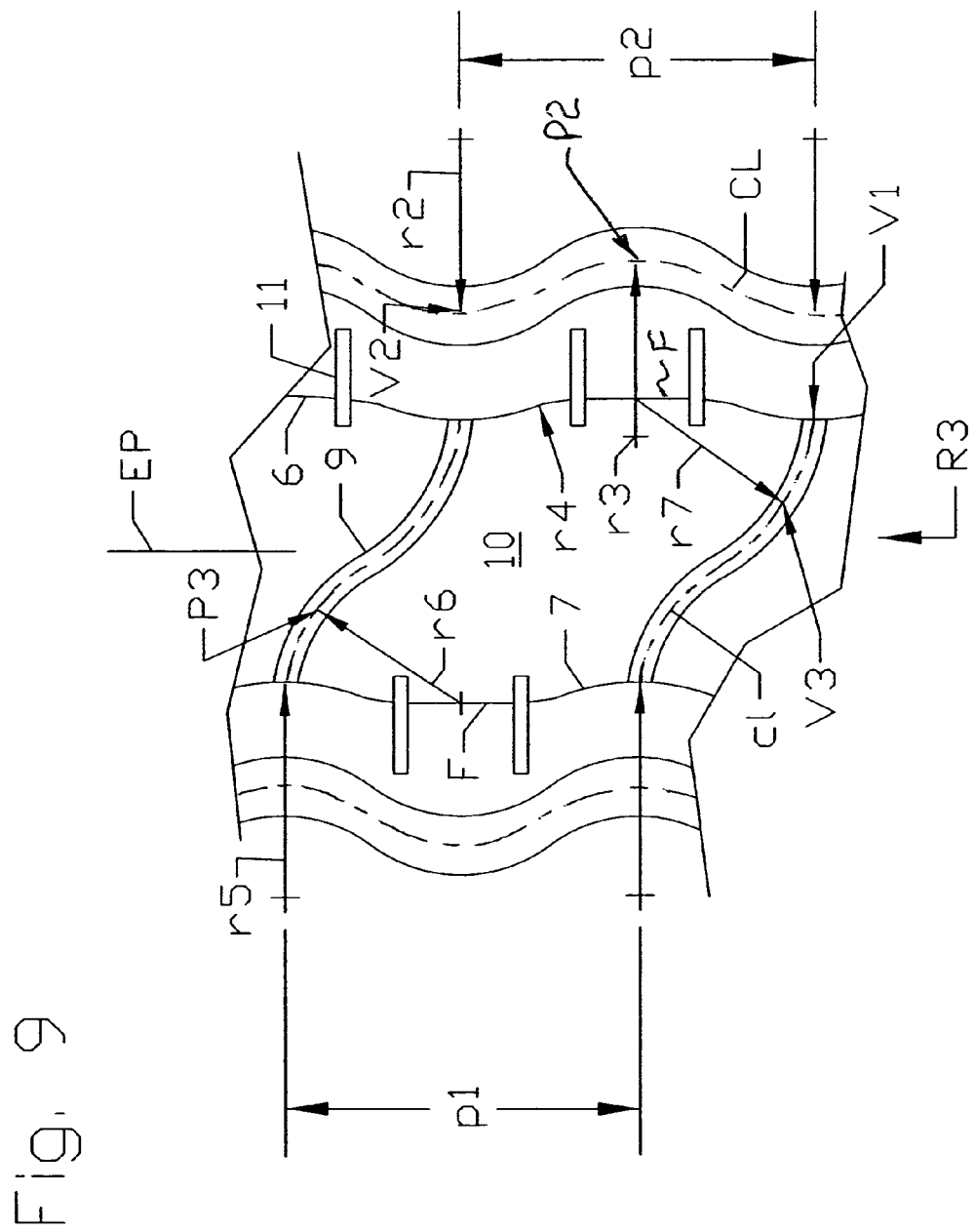
FIG. 9 is an enlarged partial view of the tread pattern of the tire of FIG. 1.

As explained above, the wavy grooves 9 extend across each of the center ribs R2-R4 and define tread blocks 10 (see FIG. 9). Furthermore, the wavy grooves 9 of the ribs R2 and R4 are circumferentially aligned and in phase with each other whereas the wavy grooves 9 of the center rib R3 are indexed by a half pitch length p1. The left ends of the wavy grooves 9 of rib R2 are centrally disposed relative to the peaks P2 of the groove base 8 of groove A which extend to the right lateral side and repeat with the same regularity as these peaks P2. The right ends of the wavy grooves 9 of rib R2 are centrally disposed relative to the peaks P2 of the groove base 8 of groove B which extend to the left lateral side and repeat with the same regularity as these peaks P2.

The left ends of the wavy grooves 9 of rib R3 are centrally disposed relative to the peaks P2 of the groove base 8 of groove B which extend to the right lateral side and repeat with the same regularity as these peaks P2. The right ends of the wavy grooves 9 of rib R3 are centrally disposed relative to the peaks P2 of the groove base 8 of groove C which extend to the left lateral side and repeat with the same regularity as these peaks P2. The left ends of the wavy grooves 9 of rib R4 are centrally disposed relative to the peaks P2 of the groove base 8 of groove C which extend to the right lateral side and repeat with the same regularity as these peaks P2. The right ends of the wavy grooves 9 of rib R4 are centrally disposed relative to the peaks P2 of the groove base 8 of groove D which extend to the left lateral side and repeat with the same regularity as these peaks P2. The wavy grooves 9 have, as a result of the particular design described herein, opposite ends which are not circumferentially aligned with each other.

Figure 3:
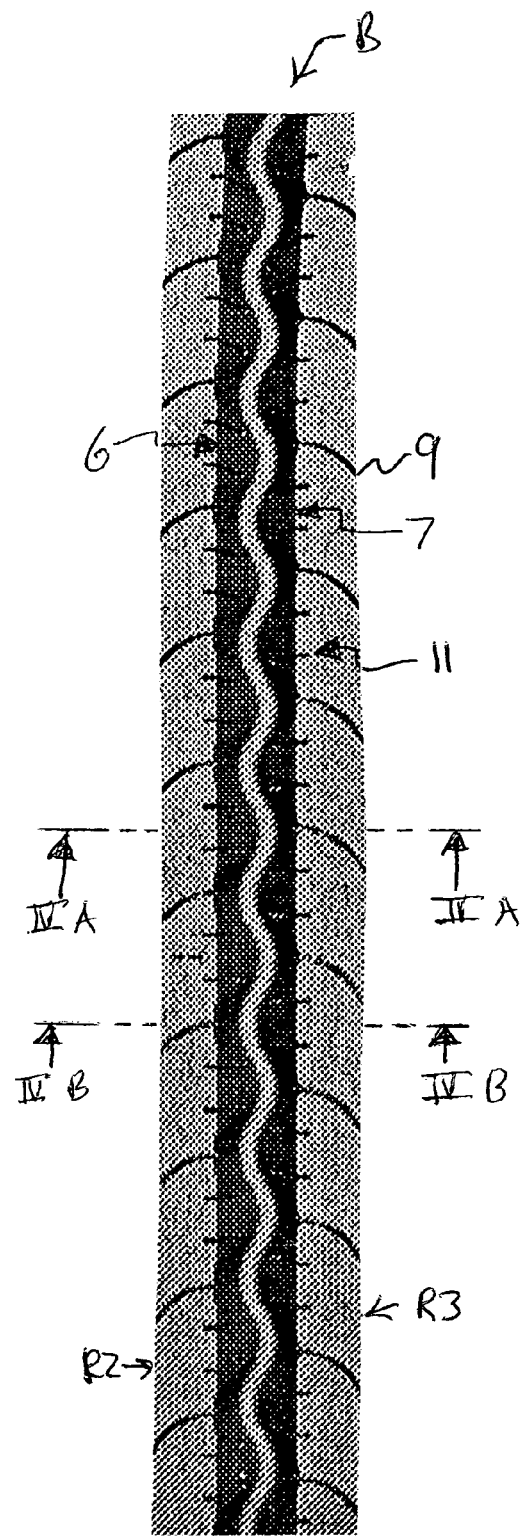
FIG. 3 is a partial view of a tread groove shown in FIG. 1 in accordance with an embodiment of the invention.
Figure 4A:
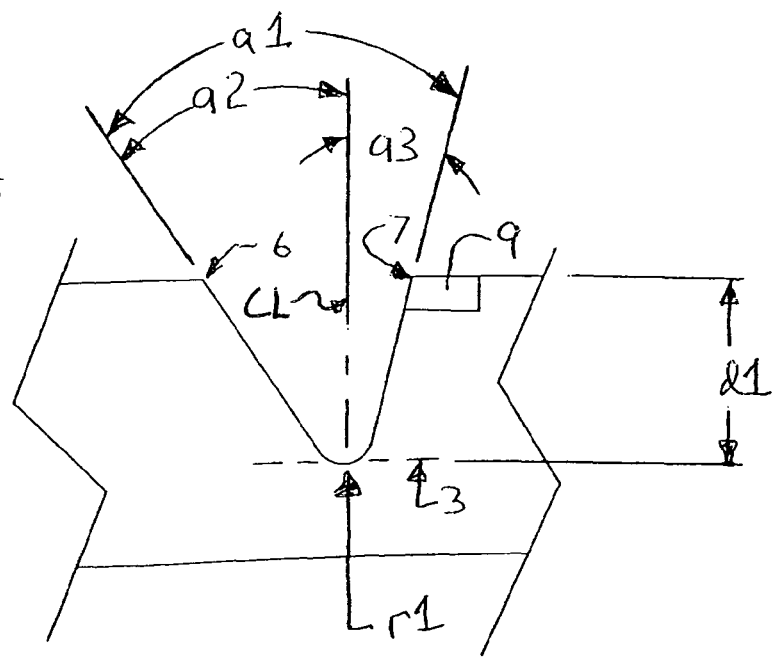
FIG. 4A is a cross sectional view of the groove shown in FIG. 3 along line IVA-IVA of FIG. 3, in accordance with an embodiment of the invention.
Figure 4B:
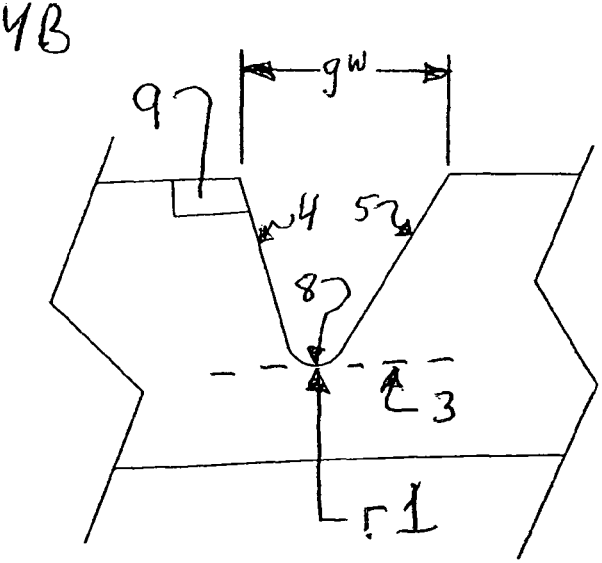
FIG. 4B is a cross sectional view of the groove shown in FIG. 3 along line IVB-IVB of FIG. 3, in accordance with an embodiment of the invention.

As can be seen in FIGS. 3, 4A and 4B, groove B has tapered side walls 4 and 5 whose angle varies due the fact that the base 8 of the groove B has a sinusoidal waveform and because the opening edges 6 and 7 have a similar but less pronounced sinusoidal waveform. The center points of the flats F (straight or non-curved portions of the groove opening edge) of the outwardly curved portions of the edge 6 are aligned and in phase with the peaks P2 of the base 8. These flats F extend across each pair of sipes 11 and have a circumferential length of approximately ⅓ of the pitch length p1. As is evident in FIG. 9, the radius r4 of curvature of the outwardly curved portions arranged on opposite sides of the flats F of edge 6 have a significantly larger radius than the radius of curvature r3 of the peaks P2 of the base 8. By way of non-limiting example, the radius r4 of the outwardly curved portions of the edge 6 can be approximately 16.2 mm. The radius r3 of the peaks P2 (measured to the center line CL of the base 8) of the base 8 can be in the range of between approximately 8 mm and approximately 12 mm and preferably have a radius of curvature of approximately 8.1 mm. The radius r5 of curvature of the valleys of edge 6 also have a significantly larger radius than the radius of curvature r2 of the valleys of the base 8. By way of non-limiting example, the radius r5 of the inwardly curved portions of the edge 6 can be approximately 16.2 mm. The radius r2 of the valleys (measured to the center line CL of the base 8) of the base 8 can be in the range of between approximately 8 mm and approximately 12 mm and preferably have a radius of curvature of approximately 8.1 mm. The outwardly curved portions and inwardly curved portions of edge 7 have substantially the same curvature as the respective portions of edge 6 and are offset circumferentially by approximately ½ of the pitch length p1.

With reference again to FIGS. 3, 4A and 4B, it can be seen that the angles a2 and a3 of the side walls 4 and 5 of the groove B vary along the circumferential direction. FIG. 4A, for example, shows that the angle a2 of side wall 4 is greater (relative to a vertical line that is parallel to the equatorial plane EP and passing through the center of the base 8) than the angle a3 of the side wall 5 of the groove B. Because FIG. 4A is a cross-section through the high point of the peak of the base 8, it represents the smallest angle a3 and the largest angle a2. On the other hand, the angle a2 of side wall 4 in FIG. 4B is less than (relative to a vertical line that is parallel to the equatorial plane EP and passing through the center of the base 8) the angle a3 of the side wall 5 of the groove B. Because FIG. 4B is a cross-section through the low point of the valley of the base 8, it represents the smallest angle a2 and the largest angle a3. Since the groove B exhibits symmetry, the angle a2 in FIG. 4A and the angle a3 in FIG. 4B will be substantially equal. Similarly, the angle a3 in FIG. 4A and the angle a2 in FIG. 4B will be substantially equal.

As is also evident in FIGS. 4A and 4B, the base 8 is inwardly curved and can have a radius of approximately 2 mm. By way of non-limiting example, the angle a1 between the side walls 4 and 5 can be approximately 46.18 degrees. Also by way of non-limiting example, the angle a2 will vary between approximately 17.04 degrees at the locations shown in FIG. 4B to approximately 29.26 degrees at the locations shown in FIG. 4A. Additionally, by way of non-limiting example, the angle a3 will vary between approximately 17.04 degrees at the locations shown in FIG. 4A to approximately 29.26 degrees at the locations shown in FIG. 4B. The opening width "gw" of groove B as measured axially between the flats F of edges 6 and 7 remains constant and can be between approximately 8 mm and approximately 20 mm, and preferably is approximately 15.7 mm. Finally, the depth "d1" of the groove B as measured from the edge 7 to the base bottom of the base 8 (which corresponds to the rib base 3) can be, by way of non-limiting example, approximately 14.9 mm.

Figure 5:
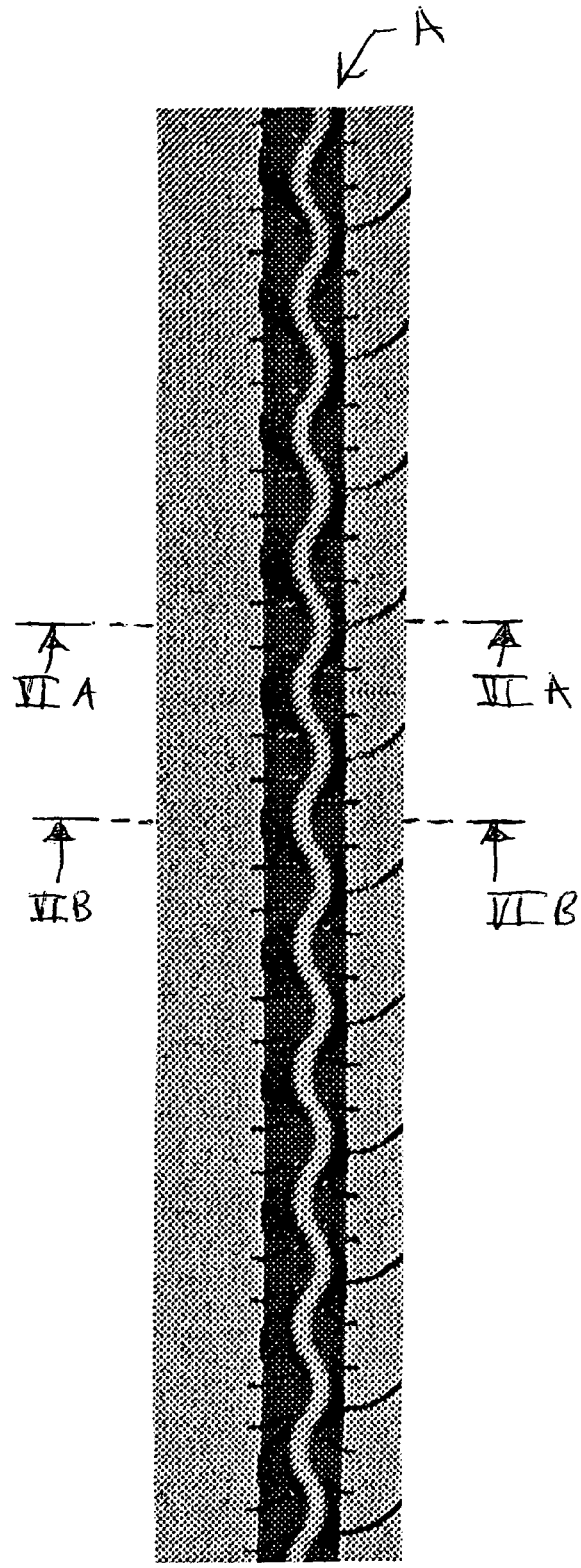
FIG. 5 is a partial view of another tread groove shown in FIG. 1 in accordance with an embodiment of the invention.
Figure 6A:
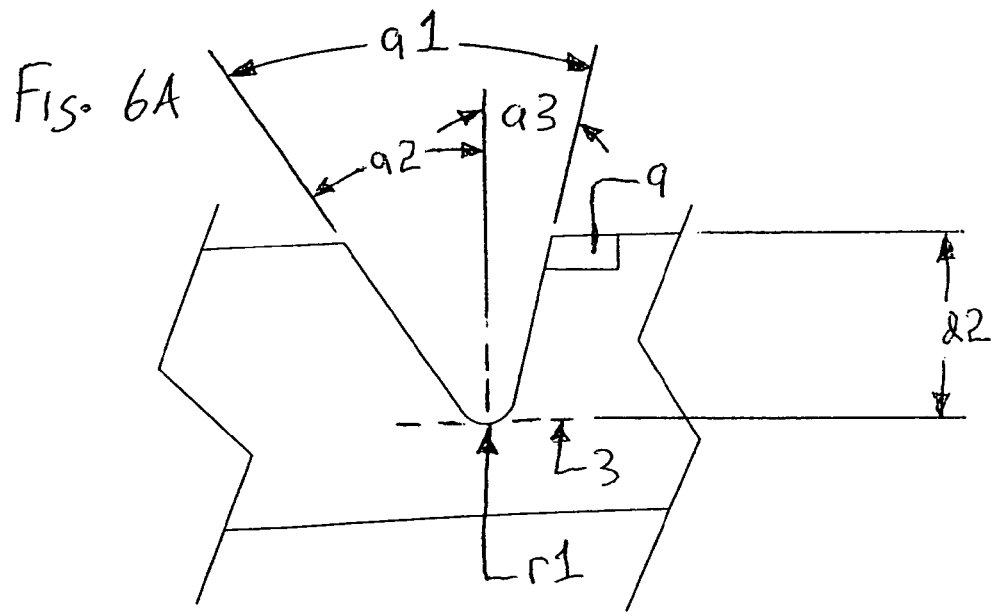
FIG. 6A is a cross sectional view of the groove shown in FIG. 5 along line VIA-VIA of FIG. 5, in accordance with an embodiment of the invention.
Figure 6B:
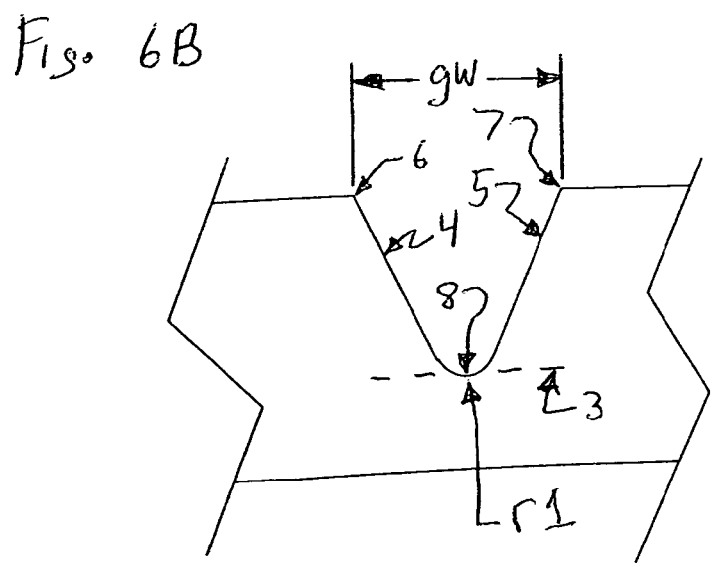
FIG. 6B is a cross sectional view of the groove shown in FIG. 3 along line VIB-VIB of FIG. 5, in accordance with an embodiment of the invention.

As can be seen in FIGS. 5, 6A and 6B, groove A also has tapered side walls 4 and 5 whose angle varies due the fact that the base 8 of the groove A, like groove B, has a sinusoidal waveform and because the opening edges 6 and 7 have a similar but less pronounced sinusoidal waveform. The center points of the flats F of the outwardly curved portions of the edge 6 are aligned and in phase with the peaks P2 of the base 8. These flats F extend across each pair of sipes 11 and have a circumferential length of approximately ⅓ of the pitch length p1. As is evident in FIG. 10, the radius r4 of curvature of the outwardly curved portions arranged on opposite sides of the flats F of edge 6 have a significantly larger radius than the radius of curvature r3 of the peaks P2 of the base 8. By way of non-limiting example, the radius r4 of the outwardly curved portions of the edge 6 can be approximately 16.2 mm. The radius r3 of the peaks P2 (measured to the center line CL of the base 8) of the base 8 can be in the range of between approximately 8 mm and approximately 12 mm and preferably have a radius of curvature of approximately 8.1 mm. The radius r5 of curvature of the valleys V1 of edge 6 also have a significantly larger radius than the radius of curvature r2 of the valleys V2 of the base 8. By way of non-limiting example, the radius r5 of the inwardly curved portions of the edge 6 can be approximately 16.2 mm. The radius r2 of the valleys V2 (measured to the center line CL of the base 8) of the base 8 can be in the range of between approximately 8 mm and approximately 12 mm and preferably have a radius of curvature of approximately 8.1 mm. The outwardly curved portions and inwardly curved portions of edge 7 have substantially the same curvature as the respective portions of edge 6 and are offset circumferentially by approximately ½ of the pitch length p1.

With reference again to FIGS. 5, 6A and 6B, it can be seen that the angles a2 and a3 of the side walls 4 and 5 of the groove A, like those of groove B, vary along the circumferential direction. FIG. 6A, for example, shows that the angle a2 of side wall 4 is greater (relative to a vertical line that is parallel to the equatorial plane EP and passing through the center of the base 8) than the angle a3 of the side wall 5 of the groove A. Because FIG. 6A is a cross-section through the high point of the peak of the base 8, it represents the smallest angle a3 and the largest angle a2. On the other hand, the angle a2 of side wall 4 in FIG. 6B is less than (relative to a vertical line that is parallel to the equatorial plane EP and passing through the center of the base 8) than the angle a3 of the side wall 5 of the groove A. Because FIG. 6B is a cross-section through the low point of the valley of the base 8, it represents the smallest angle a2 and the largest angle a3. Since the groove A exhibits symmetry, the angle a2 in FIG. 6A and the angle a3 in FIG. 6B will be substantially equal. Similarly, the angle a3 in FIG. 6A and the angle a2 in FIG. 6B will be substantially equal.

As is also evident in FIGS. 6A and 6B, the base 8 is inwardly curved and can have a radius of approximately 2 mm. By way of non-limiting example, the angle a1 between the side walls 4 and 5 can be approximately 46.18 degrees. Also by way of non-limiting example, the angle a2 will vary between approximately 17.04 degrees at locations shown in FIG. 6B to approximately 29.26 degrees at the locations shown in FIG. 6A. Additionally, by way of non-limiting example, the angle a3 will vary between approximately 17.04 degrees at the locations shown in FIG. 6A to approximately 29.26 degrees at the locations shown in FIG. 6B. The opening width "gw" of groove A as measured axially between the flats F of edges 6 and 7 remains constant and can be between approximately 8 mm and approximately 20 mm, and preferably is approximately 15.7 mm. Finally, the depth "d2" of the groove A as measured from the edge 7 to the base bottom of the base 8 (which corresponds to the rib base 3) can be, by way of non-limiting example, approximately 14.9 mm.

As explained above, angles a2 and a3 of the circumferential grooves A-D vary continuously in the circumferential direction between minimum and maximum angle values determined by the groove depth, opening width and base width and axial position of the base 8 center line CL. The position of the center line CL also changes continuously in the circumferential direction relative to an imaginary center line between the flats F of each groove A-D. Although the details of grooves A and B have been discussed herein in detail, because grooves C and D have substantially the same configuration, the details of grooves A and B would also apply to grooves C and D. In particular, the details of grooves A and D would correspond as would the details of grooves B and C.

Figure 8:
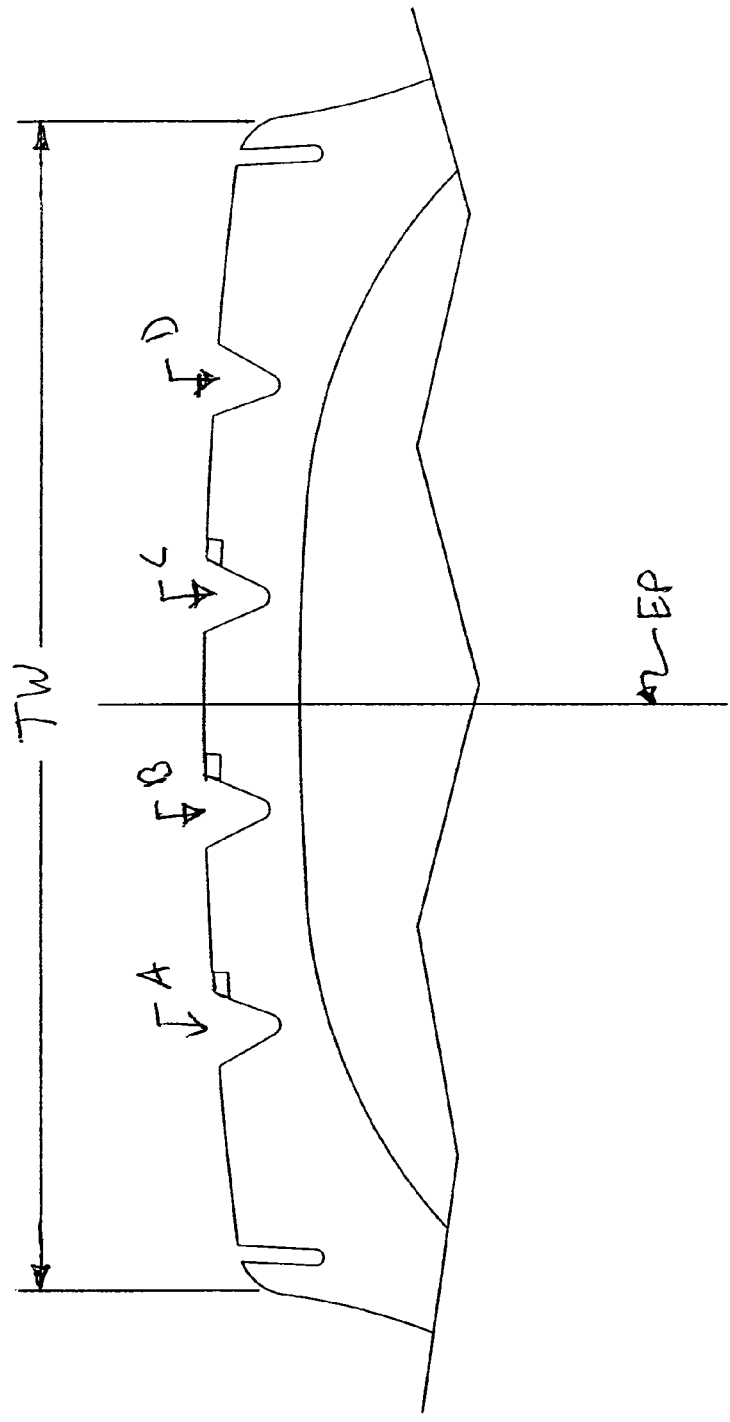
FIG. 8 is a cross sectional view of the tread pattern along line VIII-VIII of FIG. 7, in accordance with an embodiment of the invention.

Referring to FIGS. 7 and 8, it can be seen that the grooves are essentially equally spaced from each other and have a V-shaped configuration. By way of non-limiting example, the tread width TW can be approximately 220 mm. The groove base 8 radius r1 can be the same for each of the grooves A-D and can preferably be approximately 2 mm, but may also range between approximately 1 mm and 3 mm. The widths of the groove openings can also be the same for each of the grooves A-D and can depend on such variables as, for example, the depth of the groove. It should be understood by those of skill in the art that the above examples are but one non-limiting illustration of the dimensions contemplated by the present invention, and that the above dimensions can vary in accordance with other design specifications.

The following tables constitute a 3D noise simulation comparing a conventional pyramid groove design (Table A) of the type described in U.S. Pat. No. 5,246,049 (the disclosure of which is hereby incorporated by reference in its entirety) with the groove design described in the instant invention (Table B). These tables show footprint ratios of 100% (FP-100), 90% (FP-90) and 80% (FP-80). As can be seen from comparing the data in these tables, a 100% shoulder to center footprint (FP-100) is best in the conventional design; whereas, an 80% shoulder to center ratio (FP-80) provides the lowest "db" level for the invention. For example, referring to table B, an 80% footprint ratio provides a "dbA" level of 51.79 and a "db" level of 52.32. It should be noted, however, that the best footprint ratio for noise is not necessarily the best for tread wear. Thus, an 80% footprint has an increased potential for faster shoulder wear; whereas, a 100% footprint has an increased potential for faster intermediate or center rib wear.

TABLE A

|  | 53722 HSR1 FP-100 FS-56/1 | 53722 HSR1 FP-90 FS-56/1 | 53722 HSR1 FP-80 FS-56/1 |
|---|---|---|---|
| Max Ampl (Sum tracks) | 1.28 | 1.24 | 1.09 |
| Max Filter (Sum tracks) | 0.48 | 0.47 | 0.41 |
| Noise Spec. Harmonic | 1 | 1 | 2 |

TABLE A-continued

|  | 53722<br>HSR1 FP-100<br>FS-56/1 | 53722<br>HSR1 FP-90<br>FS-56/1 | 53722<br>HSR1 FP-80<br>FS-56/1 |
| --- | --- | --- | --- |
| Total level dbA | 53.87 | 54.35 | 54.32 |
| Total level db | 53.69 | 54.04 | 53.88 |
| max. ampl1 | 0.02 | 0.02 | 0.03 |

TABLE B

|  | HSR2_1<br>FP-100<br>FS-64/1 | HSR2_1<br>FP-90<br>FS-64/1 | HSR2_1<br>FP-80<br>FS-64/1 |
| --- | --- | --- | --- |
| Max Ampl (Sum tracks) | 1.50 | 1.42 | 1.27 |
| Max Filter (Sum tracks) | 0.57 | 0.54 | 0.48 |
| Noise Spec. Harmonic | 1 | 1 | 1 |
| Total level dbA | 53.15 | 52.71 | 51.79 |
| Total level db | 53.65 | 53.22 | 52.32 |
| max. ampl1 | 0.01 | 0.02 | 0.02 |

The invention results in a lower noise tire because the grooves are essentially devoid of flat surfaces and because curved surfaces dissipate sound better. Furthermore, because of the variable groove wall contour and/or the sinusoidal configuration of the base 8 and groove opening edges 6 and 7, there is reduced likelihood that stones or other debris will be trapped in the grooves A-D. That is, using the tread design of the present invention, an angle is constantly changing on the sides of the grooves A-D during roll of the footprint (e.g., rotating and flanking angles) thus contributing significantly to the release stones and/or other debris. Additionally, the varying wall contour and rounded edges improves the pressure distribution of the tire (due to the elimination of any sharp angles) which, in turn, results in: (i) superior tread wear properties; (ii) superior wet traction; (iii) reduced noise; and (iv) longer tread mileage.

It has also been found that the varying wall contour and/or rounded edges of the present invention reduces stress points in the tire due to the fact that forces cannot conjugate in one area, e.g., at any point or corner. Instead, by using the tread pattern of the present invention, the varying wall contour and rounded corners allows forces to travel upwards on the ribs R1-R5, thus eliminating places for forces to collect. This leads to improved groove cracking resistance. As one of ordinary skill in the art would recognize, the substantial reduction or elimination of stresses is due mainly to the elimination of any sharp edges or angles in the tire pattern design.

From a manufacturing standpoint, the material to produce the tread patterns should flow better into the mold since there are no sharp corners. Thus, the material does not have to squeeze into corners, but instead flows smoothly around rounded corners. This results in better material (e.g., rubber) flow in the mold during manufacturing, thus resulting in fewer defects.

The foregoing examples have been provided for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. The present invention is not intended to be limited to the particulars disclosed herein; rather, the present invention extends to all functionally equivalent structures, methods and uses, such as are within the scope of the appended claims.

What is claimed is:

1. A tire comprising:
a tread pattern having ribs;
circumferential grooves which are at least one of tapered and generally V-shaped, wherein walls of each of the circumferential grooves have inwardly and outwardly curved portions which form a wavy and/or sinusoidal contour extending in a generally circumferential direction, wherein the walls extend to a tread surface and form first and second opening edges, the first opening edge having inwardly curved portions, outwardly curved portions, and spaced-apart straight portions, the second opening edge having inwardly curved portions, outwardly curved portions, and spaced-apart straight portions, and a theoretical center line perpendicular to an axis of rotation running along the circumferential direction completely residing between the first and second opening edges; and
sipe pairs which break up the first and second opening edges of each of the circumferential grooves,
wherein the sipe pairs define the straight portions; and
each straight portion extends from a sipe to another sipe and each outwardly curved portion extends from a sipe toward another sipe.

2. The tire of claim 1, wherein:
the outwardly curved portions transition to the inwardly curved portions and the straight portions on the first opening edge are phase shifted from the straight portions on the second opening edge;
each of the straight portions is parallel to the circumferential direction; and
each of the walls having a variable wall contour.

3. The tire of claim 1, wherein each of the circumferential grooves comprises an inwardly curved groove base whose depth is substantially constant in the circumferential direction.

4. The tire of claim 1, wherein each of the circumferential grooves comprises an inwardly curved groove base having a wavy and/or sinusoidal contour extending in the generally circumferential direction.

5. The tire of claim 4, wherein each of the first and second opening edges have a generally wavy and/or sinusoidal contour extending in the generally circumferential direction.

6. The tire of claim 1, further comprising a plurality of wavy rib grooves arranged on the ribs.

7. The tire of claim 1, wherein at least one of the circumferential grooves comprises a wavy or sinusoidal groove base that travels circumferentially and laterally crosses over the theoretical center line located between the first and second opening edges of the at least one circumferential groove.

8. The tire of claim 1, wherein at least one of the circumferential grooves comprises a groove base that travels circumferentially and laterally crosses over the theoretical center line located between the first and second opening edges of the at least one circumferential groove.

9. The tire of claim 1, wherein at least one of the circumferential grooves comprises a groove base that laterally crosses over, at various circumferential positions, the theoretical center line located between the first and second opening edges of the at least one circumferential groove.

10. The tire of claim 1, wherein at least one of the circumferential grooves comprises a sinusoidal groove base that laterally crosses over, at regular intervals, the theoretical center line located between the first and second opening edges of the at least one circumferential groove.

11. The tire of claim 1, wherein each of the circumferential grooves comprises a wavy or sinusoidal groove base that laterally crosses over the theoretical center line located between the first and second opening edges of each of the circumferential groove.

12. The tire of claim 1, wherein the sipe pairs repeat with a same frequency as valleys of a sinusoidal groove base of at least one of the circumferential grooves.

13. The tire of claim 1, wherein at least one of the circumferential grooves is defined by the first and second opening edges, each having the straight portions located between two of the inwardly curved portions, wherein the inwardly curved portions of the first opening edge are aligned circumferentially with the straight portions of the second opening edge and with peaks of a sinusoidal groove base of the at least one of the circumferential groove.

14. The tire of claim 1, wherein the inwardly curved portions of the first opening edge are arranged directly opposite the straight portions of the second opening edge and the inwardly curved portions of the second opening edge are arranged directly opposite the straight portions of the first opening edge.

15. The tire of claim 1, wherein each circumferential groove comprises a groove base having a wavy or sinusoidal contour, and wherein a distance between two outwardly curved peaks of the groove base is equal to a distance between center points defining a radius of each of two inwardly curved portions of one of the first and second opening edges.

16. The tire of claim 1, wherein each circumferential groove comprises a groove base having a wavy or sinusoidal contour, and wherein a distance between two outwardly curved peaks of the groove base is equal to a distance between centers of two of the straight portions of one of the first and second opening edges.

17. The tire of claim 16, wherein a center of each of the straight portions alternating between the inwardly curved portions of the first opening edge is aligned with a center of each inwardly curved portion on the second opening edge.

18. A tire comprising:
a tread pattern having ribs;
circumferential grooves which are at least one of tapered and generally V-shaped, at least one of the circumferential grooves comprising:
inwardly and outwardly curved groove wall portions,
a groove base having a wavy or sinusoidal contour extending in a generally circumferential direction,
first and second groove opening edges each having at least inwardly curved portions, outwardly curved portions, and straight portions alternating between the inwardly curved portions, and
a theoretical center line perpendicular to an axis of rotation running along the circumferential direction and completely residing between the opening edges; and
sipe pairs which break up the first and second groove opening edges of each of the circumferential grooves, wherein the sipe pairs define the straight portions; and
each straight portion extends from a sipe to another sipe and each outwardly curved portion extends from a sipe toward another sipe.

19. The tire of claim 18, wherein the inwardly curved portions of the first groove opening edge are aligned circumferentially with the straight portions of the second groove opening edge and with peaks of the wavy or sinusoidal groove base, and wherein each of the straight portions is parallel to the circumferential direction.

20. A tire comprising:
a tread pattern having ribs;
circumferential grooves which are at least one of tapered and generally V-shaped, each of the circumferential grooves comprising:
inwardly and outwardly curved groove wall portions,
an inwardly curved groove base having a wavy or sinusoidal contour which meanders substantially axially as it travels circumferentially, and
first and second groove opening edges each having outwardly curved portions arranged between straight portions and inwardly curved portions, wherein the straight portions of the first groove opening edge alternate between the inwardly curved portions of the first groove opening edge, are phase shifted from the straight portions of the second groove opening edge, are oriented parallel to the circumferential direction, and are arranged opposite the inwardly curved portions of the second groove opening edge, and a theoretical center line perpendicular to an axis of rotation running along the circumferential direction and completely residing between the first and second groove opening edges; and
sipe pairs which break up the first and second groove opening edges of each of the circumferential grooves, wherein the sipe pairs define the straight portions, and
each straight portion extends from a sipe to another sipe and each outwardly curved portion extends from a sipe toward another sipe.

\* \* \* \* \*